United States Patent
Alles

(10) Patent No.: US 8,134,330 B2
(45) Date of Patent: Mar. 13, 2012

(54) ELECTRONIC CONTROL OF THE PRESSURE AND FLOW OF LINEAR PUMPS AND COMPRESSORS

(75) Inventor: Harold Gene Alles, Lake Oswego, OR (US)

(73) Assignee: Home Comfort Zones, Beaverton, OR (US)

( * ) Notice: Subject to any disclaimer, the term of this patent is extended or adjusted under 35 U.S.C. 154(b) by 548 days.

(21) Appl. No.: 12/256,432

(22) Filed: Oct. 22, 2008

(65) Prior Publication Data

US 2010/0100298 A1 Apr. 22, 2010

(51) Int. Cl.
*H02P 27/04* (2006.01)
(52) U.S. Cl. ............... 318/800; 318/801; 318/135
(58) Field of Classification Search .......... 318/135, 318/800, 801, 809, 400.09, 400.34, 400.36; 701/102

See application file for complete search history.

(56) References Cited

U.S. PATENT DOCUMENTS

| | | | |
|---|---|---|---|
| 5,889,629 A * | 3/1999 | Patton, III | 360/75 |
| 6,307,336 B1 * | 10/2001 | Goff et al. | 318/400.09 |
| 6,437,524 B1 | 8/2002 | Dimanstein | |
| 6,983,889 B2 | 1/2006 | Alles | |
| 2002/0084760 A1 * | 7/2002 | Messenger et al. | 318/439 |

* cited by examiner

*Primary Examiner* — Karen Masih
(74) *Attorney, Agent, or Firm* — Blakely Sokoloff Taylor & Zafman LLP

(57) ABSTRACT

A control circuit for linear motors driving pumps or compressors that provides a programmable pressure versus flow behavior. The duty cycle of a pulse width modulated drive signal to a coil in the motor is controlled by a parameter determined by the shape of the back EMF signal generated by that coil when it is not driven. The measured parameter value is compared to a target value for the present drive pulse width, and the pulse width is adjusted to reduce the difference between the measured value and the target value. The target value is stored in a table of calibrated values that determines the desired pressure versus flow behavior and can also compensate for manufacturing differences between individual pumps.

10 Claims, 4 Drawing Sheets

ELECTRONIC CONTROL OF THE PRESSURE AND FLOW OF LINEAR PUMPS AND COMPRESSORS

BACKGROUND OF THE INVENTION

1. Technical Field of the Invention

This invention relates generally linear motor fluid pumps and compressors and specifically to linear air pumps and controlling the pressure and airflow produced by linear air pumps.

2. Background Art

A linear electric motor directly produces a reciprocating motion suitable for driving pumps and compressors. The motor has a spring loaded armature that is constrained to move substantially in a single linear direction. One or more drive coils are positioned so that when an electric current passes through the coil, the magnetic field generated exerts a force on the armature causing it to move in the linear direction. The armature has a natural resonance frequency determined by the mass of the armature and the spring constant. When the coil is driven by an alternating electrical current at the resonance frequency, the linear motor efficiently produces a continuous reciprocating motion.

Linear motors are commonly used to drive diaphragm air pumps, especially for low pressure applications such as aeration of aquariums, fish ponds, and chemical processing tanks, and for inflating objects such as rafts, advertising displays, and air mattresses.

The pressure produced by a diaphragm pump depends on the airflow, reaching a maximum pressure when there is no airflow. For example when a pump is used to inflate an object with a finite volume, initially the airflow is high and the pressure is low. As the object fills, the pressure increases as the airflow decreases until airflow become zero when the object is fully inflated. The pump produces maximum pressure when there is zero airflow. The mechanical characteristics of the motor and pump determine exactly how the pressure varies as a function of the airflow.

In many applications, the pressure produced by pump must be regulated to optimize a process or prevent damage to the object or system connected to the pump. Pressure regulation can be accomplished by varying the current to the drive coils or by maintaining constant drive power while using a valve mechanism to vary the airflow and/or air pressure.

Compared to using valves, varying the drive current to control the pressure provides the advantages of using less power and increasing the operational life of the pump. This is especially important for applications that require a wide dynamic range of airflows and a pressure limit substantially less than the pump's maximum pressure. An example of such an application is the multi-zone control system for residential forced-air HVAC systems disclosed in U.S. Pat. No. 6,983,889 issued Jan. 6, 2006 to Alles. This system uses inflatable bladders to independently control the airflow to each vent. Maximum airflow is required as many bladders are being inflated or deflated, but the airflow approaches zero as all the bladders become fully inflated or deflated. However, the pump must continue to supply pressure to keep the bladders inflated and provide airflow to compensate for inevitable small leaks.

The method of using periodic pulse width modulated DC current to control the power produced by a linear pump is understood by those ordinarily skilled in the art. Such pumps are readily available form several suppliers. For example, the 6000 series DC pumps supplied by Thomas Product Division, 1419 Illinois Ave., Sheboygan, Wis. 53081, USA uses a variable pulse-width drive to control the power. The pump provides an input connection that can be externally driven to control the power, and therefore control the airflow and pressure produced by the pump.

When a periodic DC current pulse is used to drive the coil, there is a period of time when the coil is not driven. The drive circuit is in a high impedance state during this period. The collapsing magnetic field of the coil and the motion of the armature produce a back EMF (electro motive force) signal across the coil. Some linear motors use a magnetized armature to increase the coupling between the coil and the armature, thus increasing the efficiency of the motor. A magnetized armature produces a back EMF signal that is more dependent on the armature motion.

U.S. Pat. No. 6,437,524 issued Aug. 20, 2002 to Dimanstein discloses a drive circuit for a linear motor that uses the back EMF signal as feedback to adjust the frequency of the drive signal to match the natural resonance frequency of the motor and compressor system to increase power and improve efficiency.

Rotating electronically commutated motors (ECM) typically use back EMF signals to control the switching from one drive coil to another. In general the frequency of the drive pulses controls the speed and the pulse widths control the torque. U.S. Pat. No. 6,307,336 issued Oct. 23, 2001 to Goff et al. disclosed a closed loop control system where the back EMF provides feedback to the circuits that drive the coils.

The prior art has developed controls that provide specific relations between speed and torque. For example, The Think-Tank 3.0 motor supplied by GE ECM by Regal-Beloit Corporation, 200 State Street, Belait, Wis. 53511 provides a programmable ECM for blowers used in the HVAC industry. The back EMF signal provides feedback to the control circuits so the torque and speed can be independently controlled. An integrated microprocessor can be programmed to produce a specific relation between torque and speed. For example when attached to a blower, the speed and torque can be programmed to maintain a constant airflow over a wide range in pressures.

Control methods based on back EMF have not been adapted for applications that use linear motors such as air pumps. While variable power linear motors are available, external sensors and circuits are required to produce the signal that controls the power. These external components increase the cost of the system and reduce its reliability

OBJECTS OF THIS INVENTION

An object of this invention is to provide integrated programmable control for a linear air pump that is less expensive to manufacture and more reliable than the prior art.

Another object of this invention is to provide control for a linear air pump where the airflow as a function of pressure is programmable.

Another object of this invention is to provide a programmable control for a linear pump that can be calibrated to account for the manufacturing variations between pumps.

Another object of this invention is to provide a programmable control for a linear pump that can communicate with other control systems to receive commands for programming and operating and to report status and pump operating parameters.

SUMMARY

The invention uses a programmable microprocessor to generate the pulse width modulated drive signals for the coils of a linear air pump. The microprocessor processes the back EMF signal from a coil during the period when the coil is not driven to calculate a parameter related to the air pressure produced by the pump. The processor uses stored calibration data that relates this parameter to the desired function of airflow versus pressure to determine if the drive pulse width needs adjustment. The processor continually adjusts the pulse width to maintain the desired pressure. The processor also maintains a communications link to receive control commands and to communicate programming and status information with another processor.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

Figure 1:
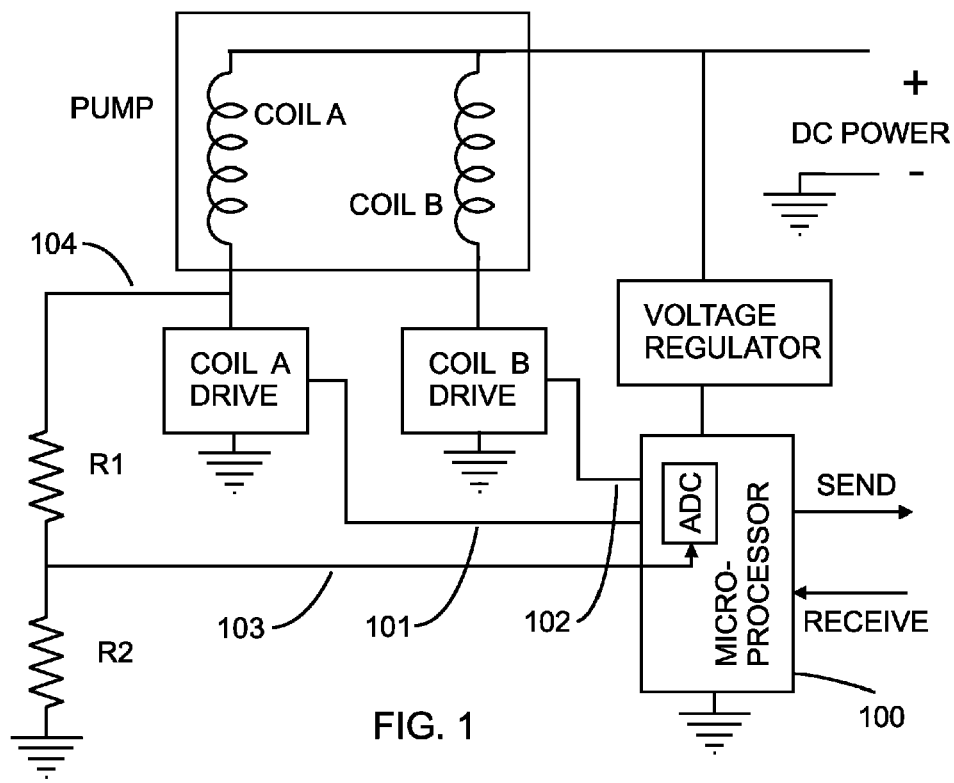
FIG. 1 is a block diagram of a microprocessor controlled drive circuit for a linear air pump.

FIG. 1 is a block diagram of a microprocessor controlled circuit to drive the coils of a typical linear air pump. The pump may have one or two coils depending on the required airflow. Low airflow pumps may use a spring action to return the armature to its neutral position and use an energized coil to drive the armature away from it neutral position. It is common for high airflow pumps to use two drive coils so that the armature is actively driven in both directions. In FIG. 1 Coil A is driven for a period of time to pull the armature in one direction and then Coil B is driven for a period of time to pull the armature in the opposite direction.

A DC power source is used to drive the coils and supply power to the microprocessor 100 through the VOLTAGE REGULATOR. The VOLTAGE REGULATOR reduces the voltage and isolates the microprocessor from noise and variations in the power supply source. Several semiconductor companies supply suitable microprocessors. The preferred embodiment uses device PIC12F675 supplied by Microchip Technology Inc., 2355 West Chandler Blvd., Chandler, Ariz. 85224-6199 (www.microchip.com). This choice should not be used to reduce or limit the generality of the invention.

One end of COIL A and COIL B is connected to the power source. COIL A DRIVE and COIL B DRIVE are controlled by binary signals generated by the microprocessor 100. When signal 101 is low, COIL A DRIVE is in a high impedance state. When signal 101 is high, COIL A DRIVE is in a low impedance state and current flows through COIL A. Likewise COIL B DRIVE is controlled by signal 102 such that when signal 102 is high, current flows through COIL B.

The microprocessor 100 determines the periods and pulse widths of signals 101 and 102. The resonance frequency of linear air pumps is typically 60 cps (cycles per seconds). The microprocessor uses its internal clock as a time reference to produce the drive signals 101 and 102 with a frequency of 60 cps.

Those ordinarily skilled in the art can readily adapt this invention to other linear pump designs that use a different number of coils and different drive frequencies. This invention is generally applicable to any linear motor where automatic power control is desirable.

At maximum power, the duty cycles of signals 101 and 102 are slightly less than 50% so there a small period of time when both drives are in a high impedance state. Shorter duty cycles use less power and produce less airflow and/or pressure. The drive signals are generated so the two periods of simultaneous high impedance states are symmetric with the periods of the low impedances state of the two drives.

When COIL A DRIVE is in its high impedance state, COIL A generates a back EMF signal 104 that depends on the changing magnetic fields around COIL A. This signal is reduced by the voltage divider formed by R1 and R2 to produce signal 103. The microprocessor uses its integrated ADC (analog to digital converter) to covert signal 103 into a series of digital samples. The microprocessor processes these samples to produce a pressure parameter that depends on the detailed shape of signal 103, which in turn depends on the air pressure generated by the pump. The microprocessor compares the pressure parameter to stored calibration data to determine if more or less power is needed to achieve the target pressure. The microprocessor then adjusts the pulse width of signals 101 and 102 for the next cycle.

The microprocessor has a RECEIVE signal input to receive digital commands and data from another processor. The microprocessor also has a SEND signal output to send digital commands and data to another processor.

Figure 2:
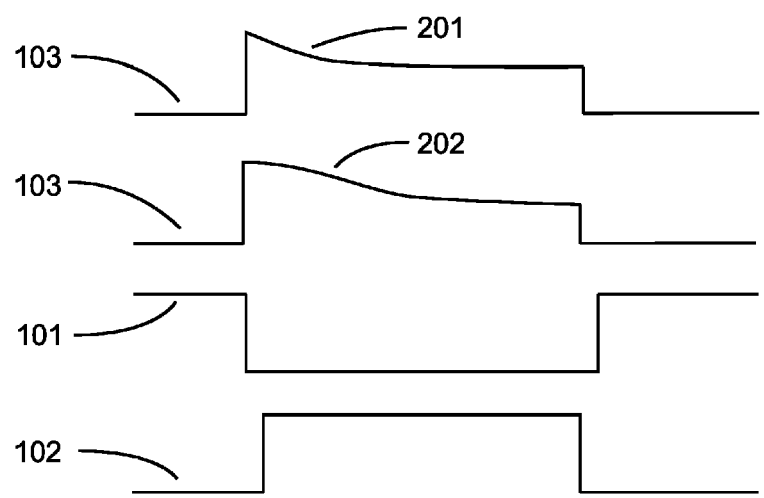
FIG. 2 shows a timing diagram of the back EMF and drive signals for two different pressures at maximum power.

FIG. 2 shows timing diagrams of the drive signals 101 and 102 when maximum power is applied to the liner pump. Both drives are in their high impedance state between the falling edge of 101 and the rising edge of 102 and between the falling edge of 102 and the rising edge of 101. Two different versions of signal 103 are also shown. The version with the shape 201 is occurs when the pump output is unconstrained so the pressure is minimum and the airflow is maximum. The version with shape 202 occurs when the pump output is constrained so that the pump produces the target pressure. The drive circuits include elements that limit voltage at the drive output to be between ground and the power supply voltage. Therefore the drive output is in a high impedance state when the signal 104 is between ground and the supply voltage.

In general, the shape of 103 following its rising edge is displaced upward as the pressure increases. For the case shown in FIG. 2, the shape in 201 is convex while the shape 202 is a concave section followed by a convex section. The shape of the back EMF signal generated by other linear motors may be different and have different variations depending on the load driven by the motor. This invention is general and does not depend on any particular behavior. It only requires that there is a reproducible relation between the load and the shape of signal 103 and that the relation is continuous.

Figure 3:
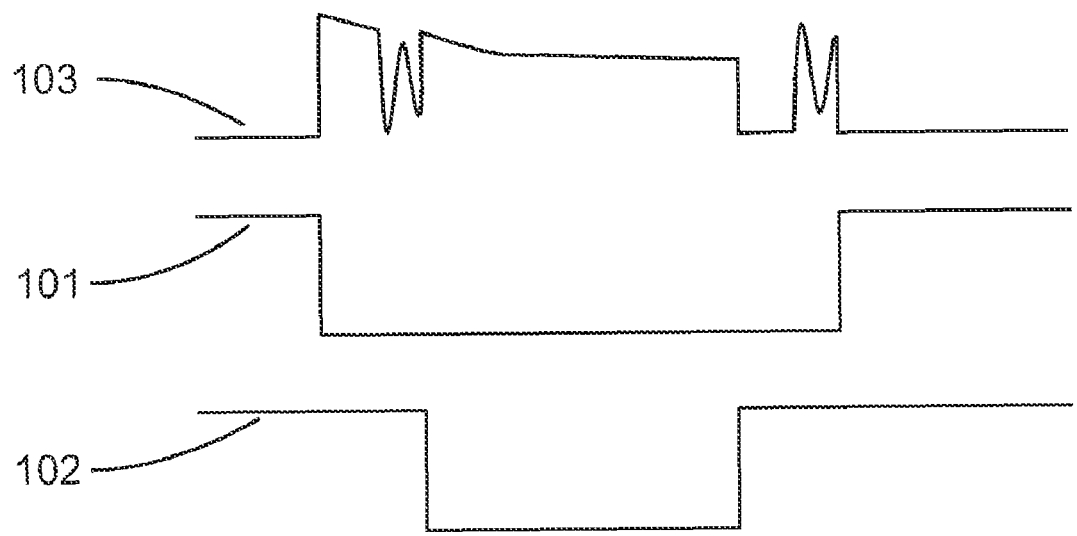
FIG. 3 shows a timing diagram of the back EMF and drive signals for medium airflow at the target pressure.

FIG. 3 shows timing diagrams of the drive signals 101 and 102 and the back EMF signal 103 for a medium level of power and the target pressure. Signal 103 has a short segment of damped oscillation shortly after the rising and falling edges of 103. The frequency of the oscillation is determined by the natural electrical resonance frequency of the coil and circuitry connected to the coil. In the preferred embodiment, this resonance frequency is about 40 times higher than the separate and independent mechanical resonance frequency of the armature.

The magnetic fields generated by COIL A and COIL B are sufficient to saturate the magnetic material around the coils and the armature. As the magnetic field collapses after removing the drive current, the magnetic material becomes unsaturated and COIL A begins a damped ringing oscillation. The oscillation amplitude rapidly decays because there is no feedback gain. The oscillations are stopped when COIL B is driven, causing the magnetic material to again saturate. In summary, the oscillations can begin after the magnetic material become unsaturated and last as long as both coil drives are in the high impedance state.

Figure 4:
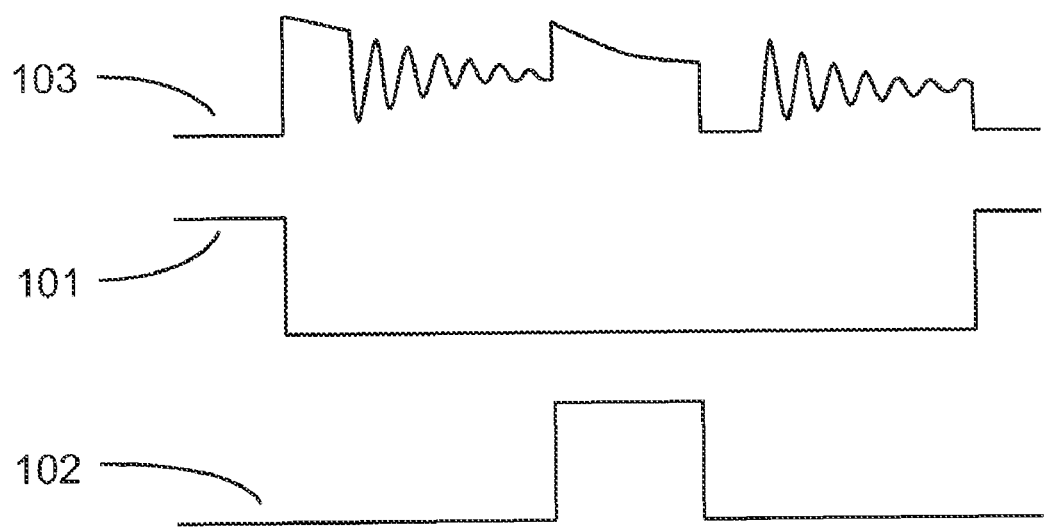
FIG. 4 shows a timing diagram of the back EMF and drive signals for minimum airflow at the target pressure.

FIG. 4 shows timing diagrams of the drive signals 101 and 102 and the back EMF signal 103 for the minimum level of power and the target pressure. Signal 103 has a long segment of damped oscillation shortly after the rising and falling edges of 103. The oscillations continue until either coil is driven.

For all variations in duty cycle of drive signals 101 and 102, the shape of the back EMF signal 103 varies with pressure in a similar way. The back EMF signal voltages increase with pressure. The largest variations occur in the segment spanning about 20% of the total drive period following the falling edge of drive signal 101. During the periods when the back EMF signals has ringing oscillations, the variations in shape of the envelop of the oscillation peaks are similar to the shape variations shown in FIG. 2

The microprocessor 100 can digitally sample the back EMF signal hundreds of times during one period of the drive signals. In the preferred embodiment, the microprocessor takes 64 equally spaced samples of signal 103 during the period when the pressure related variations are largest. For the 60 cps drive frequency of the preferred embodiment, the drive period is about 16.7 ms. The sampling begins about 1.5 ms after the falling edge of drive signal 101 and continues for about 3 ms.

The samples are processed to produce a parameter that varies smoothly and continuously with pressure for any duty cycle of the drive signals. A variety of processing methods may be used. Summing the all the samples produces a value that has acceptable properties. The summing can be done as the samples are taken, so the samples do not need to be stored and the result is available after the last sample is accumulated. No further processing is needed.

The pressure parameter calculated by sample summation has the required behavior as the pressure and drive duty cycle are varied. A second method is required to relate the measured pressure parameter to specific pressures and drive duty cycles. The preferred embodiment uses a table of calibration values and interpolation to provide the target pressure parameter value for each duty cycle. Calibration is also needed to correct for significant manufacturing variations from pump to pump. The single calibration table provides the pressure parameter relation combined with the performance calibration for a specific pump.

A further advantage of using a calibration table is that various pressure versus power behaviors can be programmed into the table values. For example, consider the multi-zone control system using inflatable bladders described in the foregoing. The nominal inflation pressure is a compromise between a low pressure that is sufficient to block airflow and a high pressure that can rapidly inflate or deflate bladders through small air tubes. However, excessive pressure in a large inflated bladder can damage the duct. Therefore the desirable air pump characteristic is relatively high pressure with large airflow (high power) and relatively low pressure with low air flow (low power). As many bladders are being inflated and deflated, it is desirable to have maximum airflow and maximum pressure. The pressure at an inflating or deflating bladder is significantly less than the pressure at the air pump due to airflow resistance of the long air tube that connects the bladder to its valve. Therefore the pressure at the pump at high power (high airflow) can be significantly higher than the nominal target pressure. As more bladders become fully inflated or deflated, the airflow decreases and the pressure increases so the power is reduce to maintain the higher pressure. As most bladders become fully inflated or deflated, the power is further decreased and the pressure target is reduced to the nominal target pressure. After all bladders are fully inflated or deflated, the only airflow required is to compensate for small leaks. Therefore the target pressure can be further reduced to be just sufficient to block airflow. This behavior is opposite the natural, uncontrolled behavior of a linear air pump.

For most practical applications, a few hundred discrete power level steps provide sufficient control and accuracy. The pressure parameter calculated by summing samples of the back EMF signal 103 varies approximately linearly over a small range of power steps. Therefore interpolation between relatively few calibration points can be used to find the target pressure parameter for each power step.

The microprocessor has a section of non-volatile memory that can be written using a special process. Once written, the contents are retained for the life of the microprocessor. This memory is used to store the calibration table. The microprocessor control program requires calibration before normal operation.

Figure 5:
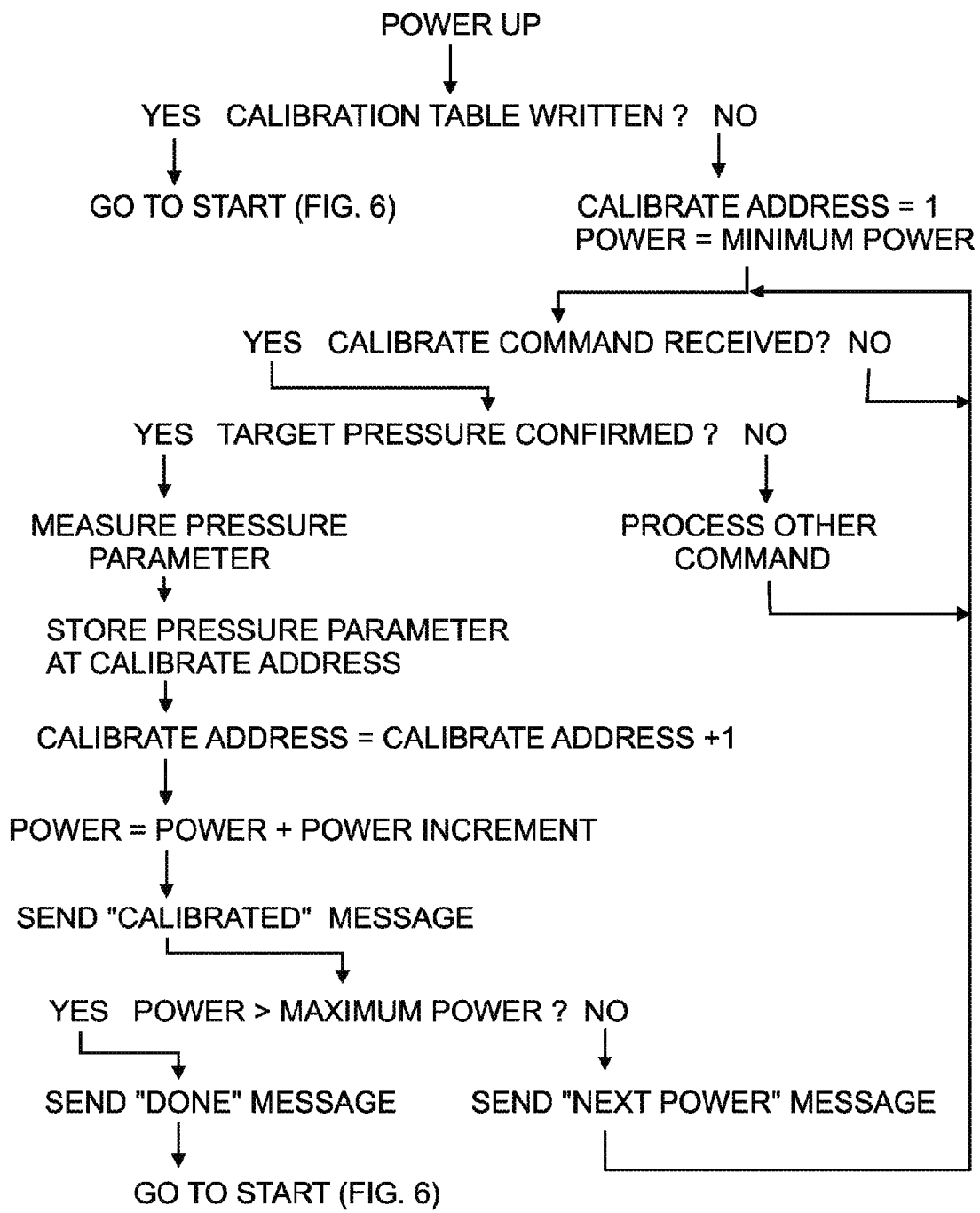
FIG. 5 is a logic flow diagram of the process to calibrate the pressure parameter table.

FIG. 5 is a logic flow diagram of the calibration process. A TIMER INTERRUP PROCESS is used to generate the drive signals 101 and 102. In the preferred embodiment, value of POWER determines the duty cycles of drive signals 101 and 102. The allowed values of POWER range from POWER MINIMUM (16) to POWER MAXIMUM (235). These values are only illustrative and should not be used to limit the generality of this invention. Those ordinarily skilled in the art can readily adapt this invention to use other microprocessors and to control other linear motors.

The timer uses the microprocessor's internal clock to generate the 60 cps drive signals and to control their duty cycles. Four interrupts are generated each period, a total of 240 interrupts per second. If POWER is set to 0, then no drive signals are generated. The pump is off. If POWER is less than MINIMUM POWER (16), then POWER is set to MINIMUM POWER. If POWER is greater than MAXIMUM POWER (235), then POWER is set to MAXIMUM POWER. The other microprocessor processing is done independent of the interrupt processing that generates the drive signals.

When power is first applied to the microprocessor, the calibration table is checked to verify calibration values have been written. If the table contains valid calibration values, the flow transfers to normal operation (START in FIG. 6).

If calibration is needed, the CALIBRATE ADDRESS is set to 1 and the POWER variable is set to MINIMUM POWER. The interrupt routine drives the pump at the current value of POWER. The microprocessor waits to receive a command from the processor controlling the calibration equipment.

The calibration equipment includes a processor that contains the desired pressure versus pump power relation. The processor can measure the pump output pressure and can control a variable airflow valve. The pump is connected to the pressure sensor and airflow valve. The microprocessor sets the pump power and waits for the calibration processor to adjust the airflow valve until the measured pressure is the target pressure for the current pump power. When the pressure is correct, the calibration processor sends a command to the microprocessor confirming the correct target pressure.

Figure 6:
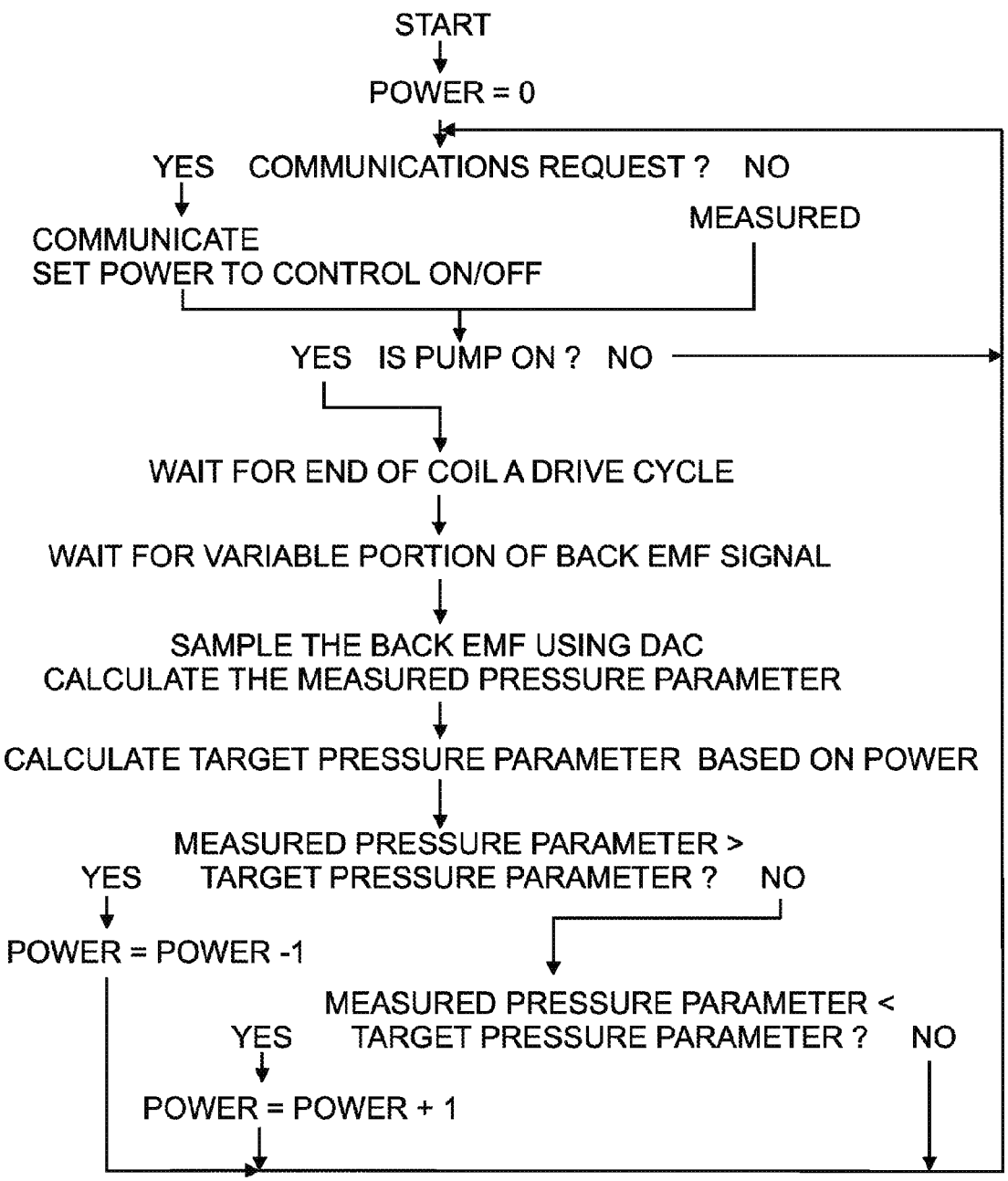
FIG. 6 is a logic flow diagram of the of the pressure control process.

When the microprocessor receives the CALIBRATE COMMAND, it measures the PRESSURE PARAMETER. The details of this process are shown in FIG. 6 and described in the following. After the PRESSURE PARAMETER is measured, it is stored in the calibration table at the current CALIBRATION ADDRESS.

CALIBRATION ADDRESS is then incremented and POWER is then increased by POWER INCREMENT. POWER INCREMENT is the interval between values in the calibration table. In the preferred embodiment, POWER INCREMENT=16 so there are 14 calibration values in the table to span the POWER range from 16 to 224. The next address corresponds to a POWER value of 240 which is greater than MAXIMUM POWER. If the new value of POWER is less than POWER MAXIMUM, then the pump microprocessor sends a "CALIBRATED" message to the calibration processor. The timer interrupt drives the pump at the current value of POWER. The pump microprocessor then waits for a command from the calibration processor.

The calibration processor then receives the "CALIBRATED" message and adjusts the airflow valve for the target pressure for the new pump power. When the pressure is stable at the target value, a command is set to the microprocessor to store the calibrated pressure parameter and set POWER to the next value for calibration.

The flow repeats until the value of POWER exceeds MAXIMUM POWER. The microprocessor then sends the "DONE" message to the calibration processor. The pump control is now calibrated and ready for operation.

FIG. 6 is a logic flow diagram of the control of the air pump. The coil drive signals are generated by the TIMER INTERRUPT PROCESS as described in the foregoing. The pump initially is off, so POWER is set to 0 so no drive signals are generated.

The operation of the pump is controlled by commands from a system processor. The basic commands turn the pump on and off. Other commands include a request for the current value of POWER and the calibration commands described in the foregoing. If the command is to turn on the pump, POWER is set to MINIMUM POWER (16). If the command is to turn the pump off, POWER is set to 0.

After the request for communications (if any) is satisfied and if the pump is off, the microprocessor continues to test for communications. If the pump is on, then the pressure parameter is measured. The drive signal 101 is monitored until it makes a transition from high to low. This is end of the drive cycle for COIL A. This transition is caused by the TIMER INTERRUPT PROCESS. After this transition, the microprocessor waits a fixed amount of time until the most variable portion of the back EMF signal 103 occurs. In the preferred embodiment, this time is about 1.5 ms. The microprocessor uses its DAC to take 64 samples of signal 103. These samples are accumulated as they are taken to calculate the MEASURED PRESSURE PARAMETER.

The current value of POWER is used to calculate the TARGET PRESSURE PARAMETER using values stored in the calibration table. The value of POWER is used to calculate the addresses of the two calibration values for power values closest to current POWER value. Then linear interpolation between these values is used to approximate the TARGET PRESSURE PARAMETER for the current value of POWER. In the preferred embodiment, the last value in the calibration table corresponds to a power value of 224. For POWER values greater than 224, the TARGET PRESSURE PARAMETER is estimated by extrapolation using the last two calibration values in the table.

The MEASURED PRESSURE PARAMETER is compared to the TARGET PRESSURE PARAMETER, and POWER may be incremented or decremented based on the comparison. If the measured value is greater than the target vale, then the pressure is too high and the power is reduced. If the measured value is less than the target value, then the pressure is too low and the power is increased. The power is not changed if the measured and target values are equal. The interrupt routine tests and limits the range of POWER twice every drive cycle. Therefore the value of POWER cannot go out of range as a result of these adjustments.

The maximum rate of change of the value of POWER is 60 per second (one increment per drive period), so it takes about 3.6 seconds for the pump power to go from MINIMUM POWER to MAXIMUM POWER. Those ordinarily skilled in the art can readily adapt the invention as described to have faster or slower rates of change.

For some linear motors and applications, the performance requirements of the motor and/or pump may also depend on some other parameter. For example temperature changes may affect the performance to the pump or drive circuits or may require a different relationship between pump pressure and pump power. Different calibration tables can be provided for different parameter values. The pump microprocessor can measure the temperature and select different calibration tables based on temperature. Alternately a computed correction factor dependent on the measured temperature can be applied to the values from the calibration table. As another example, the system processor can send commands to the microprocessor to select different tables or to apply different correction factors to the calibrated values. Those ordinarily skilled in the art can readily make such adaptations to the invention as described.

CONCLUSION

An invention that provides a general method of controlling linear motors has been disclosed. The coils of the liner motor are driven by periodic pulse width modulated signals so that a variable amount of power is generated by the linear motor. The shape of the back EMF signal generated by a drive coil is processed to produce a feedback signal that is related to the pressure or other force applied to the armature of the linear motor by an external load. The feedback signal is further processed using a calibration table to find the required amount of power to satisfy the requirements of the load for a specific application. This invention provides many benefits over the prior art including lower manufacturing costs, increased reliability, and improved ability to match the characteristics of the motor and load to the requirements of the application.

A specific embodiment of the invention for a specific application is described to illustrate the general principles of the inventions. The specific example disclosed should not be used in any way to limit or restrict the general applicability of the invention to other designs or applications. Those ordinarily skilled in the art can readily adapt the invention to uses other components and adapt the performance to meet the needs of other applications.

What is claimed is:
1. A control circuit for a linear motor air pump comprising:
a. a microprocessor programmed to control said motor;
b. said microprocessor having a means for driving a coil of said motor with a pulse width modulated signal;
c. said microprocessor having a means for sensing and processing a back electromotive force (EMF) signal generated by said coil to produce a pressure parameter related to an air pressure produced by said motor;

d. said microprocessor having a means for comparing said pressure parameter to a programmed target value for the air pressure produced by said motor;

e. said microprocessor having a means to adjust said modulated signal responsive to the comparison of said pressure parameter and said target value.

2. The control circuit of claim 1 wherein said means for sensing and processing comprises an analog to digital converter (ADC) to convert said back EMF signal into a plurality of digital samples.

3. The control circuit of claim 2 wherein said means for sensing and processing accumulates said plurality of digital samples.

4. The control circuit of claim 1 wherein said microprocessor selects said target value from a table of values stored in a memory of said microprocessor.

5. The control circuit of claim 4 wherein said target value in said table of values stored in the memory of said microprocessor is calibrated for said motor.

6. The control circuit of claim 5 wherein each of said values stored in the memory of said microprocessor is calibrated according to a calibration process.

7. A method for controlling a linear motor air pump to produce a programmable pressure versus airflow relation comprising:

a. providing a periodic pulse width modulated current to a drive coil of said pump;

b. measuring and processing a back electromotive force (EMF) signal generated by said coil to produce a pressure parameter for each said pulse width;

c. programming a target value for each said pressure parameter, each said target value corresponding to said relation;

d. adjusting said pulse width based on a comparison between said pressure parameter and said target value.

8. The method of claim 7 wherein measuring and processing said back EMF signal comprises accumulating a plurality of digital samples of said back EMF signal.

9. The method of claim 7 wherein programming said target value for each of said pressure parameters comprises creating a table of including a plurality of target values in accordance with a calibration process.

10. The method of claim 9 wherein said plurality of target values in said table of target values is less than a number of different pulse widths, and wherein said target value is selected from the plurality of target values based on the relation.

\* \* \* \* \*